United States Patent [19]

Klein et al.

[11] 4,073,877
[45] Feb. 14, 1978

[54] MANUFACTURE OF TITANIUM DIOXIDE PIGMENT SEED FROM A TITANIUM SULFATE SOLUTION

[75] Inventors: Edgar Klein, Odenthal; Reinhard Kracke, Opladen; Walter Nespital, Odenthal, all of Germany; Rüdiger Paul, deceased, late of Leverkusen, Germany

[73] Assignee: Kronos Titan G.m.b.H., Leverkusen, Germany

[21] Appl. No.: 581,217

[22] Filed: May 27, 1975

[30] Foreign Application Priority Data

July 26, 1974 Germany ............................ 2435955

[51] Int. Cl.² ........................................... C01G 23/06
[52] U.S. Cl. .................................................. 423/616
[58] Field of Search .......................... 423/615, 616, 85

[56] References Cited

U.S. PATENT DOCUMENTS

| Re. 18,854 | 5/1933 | Blumenfeld | 423/616 |
|---|---|---|---|
| 1,758,528 | 5/1930 | Mecklenberg | 423/615 |
| 2,564,365 | 8/1951 | Kingsbury | 423/615 |
| 3,071,439 | 1/1963 | Solomka | 423/85 |
| 3,501,271 | 3/1970 | Twist et al. | 423/615 |
| 3,859,212 | 1/1975 | Smalley | 423/616 |
| 3,898,321 | 8/1975 | Marsh | 423/615 |

Primary Examiner—G. O. Peters
Assistant Examiner—Brian E. Hearn

[57] ABSTRACT

The application is concerned with a process for the manufacture of a titanium dioxide pigment from a titanium sulfate solution by hydrolysis in the presence of nuclei. The latter may be formed externally from any suitable source of titanium sulfate solution and preferably, but not exclusively, from a portion of the titanium sulfate solution used in forming the hydrous $TiO_2$; the nuclei being prepared by mixing the titanium sulfate solution, from whatever source, simultaneously with an alkaline reacting solution and subsequently curing the mixture at elevated temperature. In the present application "titanium sulfate solution" is understood to be a solution which may also contain other substances besides titanium sulfate; and may be obtained, for example, by digestion of titaniferous ores or slags using sulfuric acid, followed by dissolution of the resulting digestion cake.

6 Claims, No Drawings

MANUFACTURE OF TITANIUM DIOXIDE PIGMENT SEED FROM A TITANIUM SULFATE SOLUTION

BACKGROUND OF INVENTION

In the German Pat. No. 540,863 a process has been described in which nuclei are prepared by adding an alkaline medium to a part of the titanium salt solution to be hydrolyzed; or by adding the titanium salt solution to a measured amount of the alkaline medium, and in either case in such a way that the mixture subsequently shows a pH value of 2 to 7, preferably 4 to 4.5. The mixture is subsequently maintained for some period of time at elevated temperatures ("cured"), the duration of this curing treatment and the temperature being dependent, to a great measure, on the pH value of the mixture.

A similar procedure has been described in U.S. Pat. No. 1,758,528. In this case the hydrogen ion concentration of a titanium salt solution, e.g., a titanium sulfate solution, is lowered by mixing with an alkali hydroxide or alkali carbonate solution to a pH value between 2.5 and 6, and thereafter curing the mixture.

Both procedures have disadvantages, namely, that even when the operations are carried out very carefully the nuclei so prepared are relatively inactive and must, for this reason, be added to the titanium sulfate solution in an amount of about 1% based on the titanium dioxide pigment to be made.

According to another U.S. Pat. No. 2,098,278 only enough alkaline—reacting substance is added as is necessary to obtain a pH value between 1 and 2. In this procedure coarse nuclei are obtained; and up to 15% must be added to the titanium sulfate solution to be hydrolyzed.

Further, often, nuclei prepared according to the prior art can be employed only in the form of dilute suspensions with the result that the nuclei together with rather large amounts of liquid are introduced into the titanium sulfate solution to be hydrolyzed. The conditions in this solution are thereby drastically changed.

SUMMARY OF INVENTION

The instant invention is the discovery of a method of creating nuclei, the efficiency of which, in many ways, surpasses that of known nuclei the essence of the new process of this invention being hydrolysis of a titanium sulfate solution in the presence of externally prepared nuclei which may be prepared from any suitable titanium sulfate solution and preferably but not exclusively from a portion of the titanium sulfate solution used in forming hydrous $TiO_2$; by mixing the titanium sulfate solution, from whatever source, with an alkaline-reacting solution followed by curing at elevated temperature. More particularly the process is characterized in that the mixing of the titanium sulfate solution with the alkaline reacting solution is carried out within a pH range of 1.5 to 4.0 by simultaneous addition of both solutions in a manner such that the pH of the mix remains within this pH range, the mixture thus produced then being cured.

It is possible by this method to produce nuclei that are efficient to such an extent that for the hydrolysis of a titanium sulfate solution only about 0.01 to 0.7%, calculated as $TiO_2$ and referred to the $TiO_2$ content in the titanium sulfate solution, are necessary. In this connection it has been observed that the amount of nuclei added determines largely the characteristics of the pigment obtained after calcination and milling, particularly the tinting strength and particle size. Thus with amounts of nuclei of from 0.01 to 0.02% relatively coarse pigments are obtained; whereas with additions of 0.02 to 0.07% nuclei, pigments of finer particle size are produced.

PREFERRED EMBODIMENT OF INVENTION

It is essential for the preparation of the nuclei that the admixing of the titanium sulfate solution and the alkaline reacting solution be carried out in such a way that the pH range indicated is not exceeded. If, as is the case in the prior art processes, the alkaline reacting solution is added to the titanium sulfate solution or in reverse, the titanium sulfate solution is added to the alkaline reacting solution, the pH range will be exceeded and the nuclei obtained are considerably less effective.

The admixing of the titanium sulfate solution and the alkaline reacting solution according to the method of the instant invention may be carried out at room temperature. It is, however, of advantage that the mixing of both solutions be carried out at elevated temperatures, especially at temperatures between 50° and 80° C. By using elevated temperatures the nuclei are more active as compared to nuclei obtained by mixing the solutions at room temperature.

The mixture obtained is peferably cured at temperatures between 50° and 80° C.

An advantageous form of carrying out the invention consists in mixing the two solutions at 60° C and curing the mixture obtained at 60° C.

It is particularly favorable if in the preparation of the nuclei a pH value of 2.5 to 3.0 is maintained.

The curing period is dependent on the temperature and is generally carried out in such a way that the nuclei exhibit optimum activity after the curing. At a curing temperature of 60° C a curing time of 2 to 4 hours is generally required.

More particularly preparation of the nuclei is preferably carried out using a titanium sulfate solution obtained by the digestion of ilmenite or titanium concentrates with sulfuric acid followed by dissolution of the resulting digestion cake. It is particularly advantageous if the nuclei is prepared from a portion of the titanium sulfate solution to be used in the manufacture of the titanium dioxide pigment. Further, the titanium sulfate solution employed for the nuclei may be a clarified solution prepared in the customary manner; however, a non-clarified solution may also be employed, particularly when the nuclei prepared from it are added to the titanium sulfate solution employed for the titanium dioxide pigment manufacture prior to clarification of the latter.

The efficiency of the nuclei is largely independent of the $H_2SO_4:TiO_2$ ratio of the titanium sulfate solution used in preparation of nuclei.

The mixing of the titanium sulfate solution and the alkaline reacting solution may be carried out simultaneously in a mixing nozzle. However, it may also be carried out in such a way that both solutions are simultaneously passed into a receiver which contains water at a suitable temperature the hydrogen ion concentration of which has been adjusted by the addition of an acid-reacting substance, for example, a small part of the titanium sulfate solution, so that the pH range is raised to the range to be maintained in the mixture. According to a special method of forming the externally prepared nuclei of this invention the admixing of the titanium sulfate solution with the alkaline reacting solution is carried out as follows: at first titanium sulfate solution is added, while stirring, to a definite volume of water of suitable temperature in a receiver until a TiO$_2$ concentration of a maximum of 5 gpl TiO$_2$ is obtained in the receiver. Thereafter an alkaline reacting solution is added to the solution in the receiver to adjust its pH value between 1.5 and 4.0, preferably 2.5 to 3.0. The titanium sulfate solution serving for the preparation of the nuclei and the alkaline reacting solution to be added thereto are then added simultaneously to the solution in the receiver until a concentration of from 10 to 100 gpl TiO$_2$ is obtained. It is of advantage in this case that the titanium sulfate solution added to the water in the receiver be a fraction of the titanium sulfate solution to be used in preparation of the nuclei and, after standardizing the pH of the solution in the receiver, to add the remaining part of this titanium sulfate solution simultaneously with the alkaline-reacting solution.

Solutions of hydroxides or carbonates of the alkali metals or ammonium hydroxide may, for example, serve as alkaline-reacting solutions. The use of a solution of potassium hydroxide is of particular advantage.

The nuclei suspension prepared according to the process of the invention is stable within a wide range of concentration.

The concentration of the nuclei suspension prepared as described above may be from 10 to 100 gpl TiO$_2$ after the mixing procedure. However if so desired the nuclei suspension may, after its preparation, be brought by sedimentation or filtration to a higher concentration; in this manner nuclei concentrations up to about 300 gpl TiO$_2$ may be obtained. Such concentrated nuclei are particularly advantageous because, by their addition to the titanium sulfate solution to be used for the pigment manufacture, the conditions prevailing in this solution, such as concentration or temperature, remain practically unchanged.

The activity of the nuclei is, as a rule, not changed by the individual steps of the pigment manufacturing process. For this reason the nuclei may be added at any stage of the process. Thus a preferred procedure for carrying out the process of this invention is to add the nuclei, at the earliest, after clarification of the titanium sulfate solution; and at the latest, immediately prior to the hydrolysis of the titanium sulfate solution. This procedure has the advantage that any desired clarification agent suitable for the particular purpose may be employed. It is possible, however, to add the nuclei prior to clarification. In this case a clarifying agent must be used that does not flocculate the nuclei, suitable agents being, for example, gelatin, glue or the sodium salt of the dibutyl naphthaline sulfonic acid. On the other hand the use of clarifying agents which flocculate also colloidally dissolved titanium dioxide should not be used, typical of which are polymer diethyl-amino ethyl acrylate or polyacrylamide. Clarifying agents which are suitable may be easily determined by experiment.

If the nuclei are added prior to clarification, as for example when dissolving the digestion cake, they may be added in diluted form since they represent a part of the dissolving liquid.

A particularly favorable form of carrying out the process according to the invention is characterized in that for the manufacture of the titanium dioxide pigment a titanium sulfate solution is employed which, prior to the hydrolysis, shows a weight ratio of H$_2$SO$_4$ to TiO$_2$ between 1.6 and 2.0 and which is standardized to a weight ratio of Fe to TiO$_2$ between 0.25 and 0.5 and which is largely free of other nuclei influencing the rate of hydrolysis. By "H$_2$SO$_4$" is understood, in the customary way, the "free sulfuric acid" which in the solution is not bound to cations other than titanium.

In this connection, it has been observed that the activity of the nuclei in the titanium sulfate solution is not affected by the customary separation and removal of iron as ferrous sulfate heptahydrate.

The process according to the invention is suitable for the manufacture of anatase pigments as well as for the manufacture of rutile pigments. If the invention is to manufacture anatase pigments then rutile-formation preventing substances that are known for this purpose, e.g., phosphoric acid or phosphates, are added at any stage of the process but prior to the calcination of the titanium dioxide hydrate.

For the manufacture of rutile pigments, substances promoting the rutile formation may be added. The addition may be carried out prior to the hydrolysis of the titanium sulfate solution. It may also be done during and/or after the hydrolysis but at the lates prior to the calcination of the hydrated titanium dioxide. Known examples of such rutile-promoting substances are sols which have been prepared by treating titanium dioxide hydrate with sodium hydroxide, filtering and peptizing with hydrochloric acid; or hydrated titanium dioxide which had been prepared from titanium tetrachloride solutions. However, other substances which are suitable for this purpose may be employed.

The process according to the invention is explained in further detail by the following examples.

EXAMPLE I

As a starting solution for the preparation of the nuclei and for the manufacture of titanium dioxide hydrate with the aid of these nuclei, a titanium sulfate solution was used which had been prepared in conventional manner by digestion of an ilmenite ore with sulfuric acid, dissolution of the resulting digestion cake to form a titanium-sulfate iron sulfate solution, reduction, clarification of this solution, and separation of a part of the iron sulfate as ferrous sulfate heptahydrate. The solution had the following composition:

TiO$_2$ content: 160 gpl
Weight ratio free H$_2$SO$_4$:TiO$_2$: 1.7
Weight ratio Fe: TiO$_2$: 0.4
Ti$^{3+}$content: 1 to 2 gpl (calculated as TiO$_2$)

For the preparation of the nuclei 1 liter of water of 60° C temperature was placed in a vessel fitted with a stirrer. Into this water were passed, while stirring and within 15 minutes, simultaneously, 1 liter of the titanium sulfate solution which had a temperature of 60° C, and 1 liter potassium hydroxide solution of room temperature having a content of 160 gpl K$_2$O. The operation was arranged in such a way that during the entire mixing period a constant pH value of 2.8 was maintained in the liquid. The temperature was maintained at 60° C. After the mixing the mixture was cured for 4 hours at 60° C. The nuclei thus obtained consisted of a suspension of flocculated hydrated titanium dioxide having a concentration of about 50 gpl TiO$_2$. It was stable for several weeks without losing its efficiency.

For precipitation of hydrated titanium dioxide with the aid of these nuclei, the above-mentioned titanium sulfate solution was first concentrated by evaporation to 230 gpl TiO$_2$. Following this an amount of the above-stated nuclei was added such that the nuclei addition was 0.02%, calculated as $TiO_2$ and referred to $TiO_2$ in the titanium sulfate solution. The nucleated solution was hydrolyzed, wherein the hydrolysis was essentially carried out as described in British Pat. No. 697,673. The yield of hydrated titanium dioxide was about 95%.

This hydrated titanium dioxide was worked up in the customary manner to a high grade pigment.

EXAMPLE IA

For comparison, nuclei prepared according to methods of the prior art were prepared and employed. Thus for preparation of the nuclei 1 liter of the above-mentiond titanium sulfate solution was diluted with 1 liter water at room temperature and then mixed while stirring with 1 liter of the above-mentioned potassium hydroxide solution; the mixture had a pH of 2.8. It was cured for 4 hours at 60° C.

Using these nuclei titanium dioxide hydrate was precipitated under the same conditions as in Example 1. The yield was only 90% and the pigments manufactured from this hydrated titanium dioxide were of poor quality.

Similar negative results were obtained when the water-diluted titanium sulfate solution was maintained at 60° C during the addition of the potassium hydroxide solution; or when the same amount of ater was used for the dilution of the potassium hydroxide solution instead of the titanium sulfate solution.

Also, when in the preparation of the nuclei the potassium hydroxide solution was introduced into the receiver first and the titanium sulfate solution then added, cold or warm, similar unsatisfactory results were obtained.

EXAMPLE II 1 liter of water having a temperature of 60° C was put in a vessel fitted with a stirrer; into this water were added, first, 20 cc of the 60° C warm titanium sulfate solution mentioned in Example 1, whereupon the pH of the solution was adjusted to 2.8 by the addition of potassium hydroxide solution with a content of 160 gpl $K_2O$. The $TiO_2$ concentration in the receiver was about 3 gpl. Subsequently 1 liter of the 60° C warm titanium sulfate solution and potassium hydroxide solution of the above-stated concentration of room temperature were simultaneously added within a period of 15 minutes the rate of addition of the potassium hydroxide solution being regulated in such a way that during the entire period of mixing a constant pH value of 2.8 was maintained. During all additions stirring in the receiver was carried out and the temperature maintained at 60° C. After the mixing the suspension was cured for 4 hours at 60° C.

The nuclei prepared in this manner had the same efficiency as those prepared in Example 1.

EXAMPLE III

Nuclei were prepared as in Example 1. These nuclei were added during dissolution of a digestion cake prepared from the digestion of ilmenite. The amount of nuclei added was 0.06% calculated as $TiO_2$ and referring to $TiO_2$ in the digestion cake. The resulting solution was then clarified in the known manner using the sodium salt of dibutylnaphthaline sulfonic acid and further worked up in a manner known as such. During the working up of the solution the nuclei did not lose any efficiency. The titanium sulfate solution was then hydrolyzed, as in Example 1, with the difference that no additional nuclei were added during hydrolysis. The yield of precipitated hydrate was about 96% and could in the known way be worked up further to a high grade pigment.

EXAMPLE IV

The nuclei were prepared as in Example 1. After its preparation it was permitted to stand for two days at room temperature; during this period the flakes of hydrated titanium dioxide settled. The supernatant solution was decanted in such a way that the concentration of the remaining suspension after the stirring up was 100 gpl $TiO_2$.

0.06% of these concentrated nuclei were added, as in Example 1, to a titanium sulfate solution immediately prior to hydrolysis. Precipitation yield and quality of the hydrated titanium dioxide were just as good as in Example III.

It is claimed:

1. In a process for preparing nuclei for use in the manufacture of titanium dioxide pigment by hydrolysis of a titanium sulfate solution wherein the nuclei is formed by mixing a titanium sulfate solution with an alkaline-reacting substance followed by curing the mix at elevated temperature, the improvement comprising the steps of: first adding titanium sulfate solution to water at temperatures between room temperature and 80° C. and in amount to form a dilute, aqueous sulfate solution having a maximum $TiO_2$ concentration of about 5 gpl, admixing an alkaline-reacting solution with said dilute aqueous solution in an amount to form an acid mixture having a pH from 2.5 to 3.0, thereafter adding additional titanium sulfate solution and additional alkaline-reacting solution to said acid mixture, said additional titanium sulfate solution and said additional alkaline-reacting solution being added simultaneously at temperatures between 50° C. and 80° C., at rates sufficient to maintain the pH of the resulting mixture substantially constant within the range of from 2.5 to 3.0, and in amounts to achieve $TiO_2$ concentration of from 10 to 100 gpl $TiO_2$, and thereafter curing the concentrated mixture.

2. Process according to claim 1, characterized in that the concentrated mixture is cured at temperatures between 50° and 80° C.

3. Process according to claim 1, characterized in that the simultaneous addition of both solutions is carried out at 60° C and the concentrated mixture produced is cured at 60° C.

4. Process according to claim 1 characterized in that the titanium sulfate solution used for preparation of the nuclei is derived from the titanium sulfate solution used in the manufacture of the hydrous titanium dioxide.

5. Process according to claim 1, characterized in that a potassium hydroxide solution is employed as alkaline-reacting solution.

6. Process according to claim 1, characterized in that a titanium sulfate solution is employed which has a weight ratio of $H_2SO_4$ to $TiO_2$ between 1.6 and 2.0 and a weight ratio of Fe to $TiO_2$ between 0.25 and 0.5.

* * * * *